United States Patent
Luzzi et al.

(10) Patent No.: US 12,537,338 B2
(45) Date of Patent: Jan. 27, 2026

(54) OBSTRUCTION FEATURE FOR ENSURING PROPER CONNECTIVITY IN A CABLE ASSEMBLY

(71) Applicant: Richards Mfg. Co. Sales, LLC, Irvington, NJ (US)

(72) Inventors: Glenn J. Luzzi, Mt. Bethel, PA (US); Jeffrey J. Madden, Bernardsville, NJ (US)

(73) Assignee: Richards Mfg. Co. Sales, LLC, Irvington, NJ (US)

( * ) Notice: Subject to any disclaimer, the term of this patent is extended or adjusted under 35 U.S.C. 154(b) by 371 days.

(21) Appl. No.: 18/354,520

(22) Filed: Jul. 18, 2023

(65) Prior Publication Data

US 2024/0030651 A1  Jan. 25, 2024

Related U.S. Application Data

(60) Provisional application No. 63/369,217, filed on Jul. 22, 2022, provisional application No. 63/371,321, filed on Aug. 12, 2022.

(51) Int. Cl.
*H01R 13/621* (2006.01)

(52) U.S. Cl.
CPC .............................. *H01R 13/6215* (2013.01)

(58) Field of Classification Search
CPC ...... H01R 13/6215; H01R 4/56; H01R 13/20; H01R 11/05; H01R 13/53; F16B 37/00; F16B 35/00
See application file for complete search history.

(56) References Cited

U.S. PATENT DOCUMENTS

| | | | |
|---|---|---|---|
| 3,515,798 A | 6/1970 | Sievert | |
| 3,824,331 A | 7/1974 | Beinhaur | |
| 3,980,374 A | 9/1976 | Fallot | |
| 3,993,387 A | 11/1976 | Venezia | |
| 4,135,553 A | 1/1979 | Evans | |
| 4,354,721 A * | 10/1982 | Luzzi | H01R 13/53 439/306 |

(Continued)

FOREIGN PATENT DOCUMENTS

| | | |
|---|---|---|
| DE | 102008055124 A1 | 7/2010 |
| EP | 3627632 A1 | 3/2020 |

(Continued)

*Primary Examiner* — Vanessa Girardi
(74) *Attorney, Agent, or Firm* — Myers Bigel, P.A.

(57) ABSTRACT

An elbow connector receives a cable assembly having a lug with a lug aperture. The elbow connector comprises a receiving cavity for the lug of the cable assembly and a fastener assembly. The fastener assembly has a connecting rod, a fastener tube, and a fastener. The fastener is configured for movement within the fastener tube. The connecting rod has a bumper for engaging the lug and an obstruction element for engaging the fastener. The connecting rod is moveable between (i) a blocking position in which the obstruction element indicates the fastener is unaligned with the lug aperture, and (ii) a non-blocking position in which the fastener is free of the obstruction element and aligned with the lug aperture. The connecting rod transitions to the non-blocking position in response to the lug moving the bumper to a point where the fastener and the lug aperture are aligned.

20 Claims, 7 Drawing Sheets

(56) References Cited

U.S. PATENT DOCUMENTS

| | | | |
|---|---|---|---|
| 5,309,313 A | 5/1994 | Yaworski | |
| 5,421,750 A | 6/1995 | Crotty | |
| 5,922,423 A | 7/1999 | Jeremko | |
| 5,923,518 A | 7/1999 | Hensley | |
| 6,103,975 A | 8/2000 | Krabs | |
| 6,189,575 B1 | 2/2001 | Ions | |
| 6,302,633 B1* | 10/2001 | Poe | F16B 37/00 411/432 |
| 6,337,440 B1 | 1/2002 | Ions | |
| 6,392,861 B1 | 5/2002 | Trinh | |
| 6,811,418 B2 | 11/2004 | Jazowski | |
| 7,901,243 B1 | 3/2011 | Yaworski | |
| 7,985,093 B2* | 7/2011 | Luzzi | H01R 13/641 439/921 |
| 8,018,707 B2 | 9/2011 | Yaworski | |
| 8,178,782 B2 | 5/2012 | Kamel | |
| 8,328,569 B2 | 12/2012 | Roscizewski | |
| 8,602,800 B2 | 12/2013 | Borgstrom | |
| 8,853,563 B2 | 10/2014 | Verner | |
| 9,059,581 B2 | 6/2015 | Luzzi | |
| 9,112,322 B2 | 8/2015 | Siebens | |
| 9,202,612 B2 | 12/2015 | Hernandez | |
| 9,240,649 B2 | 1/2016 | Battle | |
| 9,350,103 B2 | 5/2016 | Siebens | |
| 9,444,176 B2 | 9/2016 | Siebens | |
| 9,728,307 B2 | 8/2017 | Luzzi | |
| 10,388,438 B2* | 8/2019 | Luzzi | H01R 13/53 |
| 12,049,917 B2* | 7/2024 | Rice | F16B 41/002 |
| 2006/0216992 A1 | 9/2006 | Hughes | |
| 2006/0286837 A1 | 12/2006 | Luzzi | |
| 2009/0253289 A1 | 10/2009 | Luzzi | |
| 2010/0149715 A1 | 6/2010 | Yaworski | |
| 2010/0200265 A1 | 8/2010 | Lu | |
| 2010/0206600 A1 | 8/2010 | Hofmeister | |
| 2010/0261383 A1 | 10/2010 | Su | |
| 2010/0279543 A1 | 11/2010 | Nguyen | |
| 2012/0156934 A1 | 6/2012 | Lee | |
| 2012/0208386 A1 | 8/2012 | Beuster | |
| 2015/0295372 A1 | 10/2015 | Maroney | |
| 2016/0094021 A1 | 3/2016 | Ramarge | |
| 2017/0148553 A1 | 5/2017 | Luzzi | |

FOREIGN PATENT DOCUMENTS

| | | |
|---|---|---|
| FR | 2962262 B1 | 7/2013 |
| GB | 9705695 A | 9/1998 |
| GB | 9705697 A | 2/2000 |
| GB | 9705692 A | 4/2000 |

* cited by examiner

OBSTRUCTION FEATURE FOR ENSURING PROPER CONNECTIVITY IN A CABLE ASSEMBLY

RELATED APPLICATIONS

This application claims priority to U.S. Provisional Application Ser. No. 63/369,217, filed on Jul. 22, 2022, and U.S. Provisional Application Ser. No. 63/371,321, filed on Aug. 12, 2022, each of which is herein incorporated by reference in its entirety.

COPYRIGHT

A portion of the disclosure of this patent document may contain material which is subject to copyright protection. The copyright owner has no objection to the facsimile reproduction by anyone of the patent disclosure, as it appears in the Patent and Trademark Office patent files or records, but otherwise reserves all copyright rights whatsoever

FIELD OF THE INVENTION

The present invention relates to an impedance assembly for ensuring proper assembly of a cable and lug assembly and the elbow.

BACKGROUND OF THE INVENTION

Known elbow connectors are used to connect a cable assembly to an electrical device, such as a transformer or a high voltage switch. To do so, a series of bores and components must be aligned within the elbow connector to connect the cable assembly to the electrical device. The cable assembly usually includes a metallic lug coupled to the cable. The lug typically includes an aperture. When the lug is properly inserted into the elbow connector, the lug aperture is aligned with the receiving cavity of a female device and a fastener of the male device, which are electrically coupled to the electrical device. The fastener is inserted through the aperture on the lug and then received by the receiving cavity of the female device to form the electrical connection.

Because this installation process take place within the elbow connector, the mating of these components is blind to the user, which leads to installation problems. For example, proper installation requires the fastener to being fully inserted through the aperture of the lug and into the female mating device. However, rather than being fully inserted through the aperture of the lug, the fastener may miss the aperture of the lug, resulting in only the top portion of the lug being clamped between the mating faces.

Consequently, there is a need for a more reliable and efficient method of making connections in elbow connectors. The present disclosure provides a new installation technique and new components for making a reliable connection. All these and other objects of the present invention will be understood through the detailed description of the invention below.

SUMMARY OF THE INVENTION

In one aspect, the present invention is directed to an elbow connector for receiving a cable assembly having a lug with a lug aperture. The elbow connector comprises a receiving cavity for receiving the lug of the cable assembly and a fastener assembly. The fastener assembly has a connecting rod and a fastener, and a fastener tube. The fastener is movable through the lug the fastener tube and the lug aperture. The connecting rod has a bumper for engaging the lug and an obstruction element for engaging the fastener. The connecting rod is moveable between (i) a blocking position in which the obstruction element inhibits movement of the fastener toward the lug aperture and (ii) a non-blocking position in which the fastener is free to move into the lug aperture. The connecting rod transitions to the non-blocking position in response to the lug moving the bumper to a position when the lug aperture is aligned with the fastener.

In another aspect, the present invention is directed to a fastener assembly for an elbow connector. The elbow connector is for receiving a cable assembly having a lug with a lug aperture. The fastener assembly comprises a fastener, a fastener tube, and a connecting rod. The fastener is configured for movement through the fastener tube and the lug aperture. The connecting rod has a bumper and an obstruction element. The connecting rod is moveable between (i) a blocking position in which the obstruction element inhibits movement of the fastener toward the lug aperture and (ii) a non-blocking position in which the fastener is free to move past the obstruction element and into the lug aperture. The connecting rod transitions under a bending motion to the non-blocking position in response to the lug moving the bumper of the connecting rod to a certain position when the lug aperture is aligned with the fastener.

In a further aspect, the present invention is a fastener assembly for an elbow connector. The elbow connector is for receiving a cable assembly having a lug with a lug aperture. The fastener assembly comprises a fastener, a fastener tube, and a connecting rod. The fastener is configured for movement through the fastener tube and the lug aperture. The connecting rod has a bumper and an obstruction element located along the connecting rod at a positon away from the bumper. The connecting rod is moveable between (i) a blocking position in which the obstruction element inhibits movement of the fastener toward the lug aperture and (ii) a non-blocking position in which the fastener is free to move past the obstruction element and into the lug aperture. The connecting rod transitions to the non-blocking position via linear movement of the connecting rod along its primary axis in response to the lug moving the bumper of the connecting rod to a certain position when the lug aperture is aligned with the fastener.

In another aspect, the present invention is directed to an elbow connector for receiving a cable assembly having a lug with a lug aperture and a threaded stud. The elbow connector comprises a receiving cavity for receiving the lug of the cable assembly and a female fastener assembly. The female fastener assembly includes a connecting rod, a fastener, and fastener tube. The fastener is rotatable within the fastener tube and includes internal threads for receiving a threaded stud that is inserted through the lug aperture. The connecting rod has a bumper for engaging the lug and an obstruction element for engaging the fastener to prevent rotation. The connecting rod is moveable between (i) a blocking position in which the obstruction element inhibits rotation of the fastener and (ii) a non-blocking position in which the fastener is free to rotate within the fastener tube and engage the threaded stud. The connecting rod transitions to the non-blocking position in response to the lug moving the bumper to a position when the lug aperture is aligned with the fastener. In another embodiment, the connecting rod for the female fastener assembly transitions to the non-blocking position via linear movement of the connecting rod along its primary axis in response to the lug moving the bumper of the connecting rod to a certain position when the lug aperture is aligned with the fastener. In yet a further alternative, the connecting rod for the female fastener assembly transitions under a bending motion to the non-blocking position in response to the lug moving the bumper of the connecting rod to a certain position when the lug aperture is aligned with the fastener.

The present invention is also directed to an elbow connector for receiving a cable assembly having a lug with a lug aperture. The elbow connector comprises a receiving cavity for the lug of the cable assembly and a fastener assembly. The fastener assembly has a connecting rod, a fastener tube, and a fastener. The fastener is configured for movement within the fastener tube. The connecting rod has a bumper for engaging the lug and an obstruction element for engaging the fastener. The connecting rod is moveable between (i) a blocking position in which the obstruction element indicates the fastener is unaligned with the lug aperture, and (ii) a non-blocking position in which the fastener is aligned with the lug aperture. The connecting rod transitions to the non-blocking position in response to the lug moving the bumper to a position at which the lug is positioned such that the lug aperture is aligned with the fastener. The fastener can be a male fastener or a female fastener.

The present invention is also an elbow connector for receiving a cable assembly having a lug with a lug aperture. The elbow connector comprises a receiving cavity for the lug of the cable assembly and a fastener assembly. The fastener assembly has a connecting rod, a fastener tube, and a fastener. The fastener is configured for movement within the fastener tube. The connecting rod has a bumper for engaging the lug and an obstruction element for engaging the fastener. The connecting rod is moveable between (i) a blocking position in which the obstruction element resists a certain movement of the fastener within fastener tube, and (ii) a non-blocking position in which the fastener is movable within the fastener tube. The connecting rod transitions to the non-blocking position in response to the lug moving the bumper to a position at which the lug is positioned such that the lug aperture is aligned with the fastener. The fastener can be a male fastener or a female fastener. The certain movement can be rotational movement and/or linear movement toward the lug.

In another aspect, the present invention is directed to an elbow connector for receiving a cable assembly. The cable assembly has a lug with a lug aperture. The elbow connector includes a receiving cavity for the lug of the cable assembly and a fastener assembly. The fastener assembly has a connecting rod, a fastener tube, and a fastener. The fastener is configured for movement within the fastener tube. The connecting rod has a bumper for engaging the lug and an obstruction element for engaging the fastener. The connecting rod is moveable between (i) a blocking position in which the obstruction element resists a certain movement of the fastener within the fastener tube and (ii) a non-blocking position in which the fastener is movable within the fastener tube. The connecting rod transitions to the non-blocking position in response to the lug moving the bumper to a position at which the lug is positioned such that the lug aperture is aligned with the fastener.

In another aspect, the present invention is directed to an elbow connector for receiving a cable assembly. The cable assembly has a lug with a lug aperture. The elbow connector includes a receiving cavity for the lug of the cable assembly and a fastener assembly. The fastener assembly has a connecting rod, a fastener tube, and a fastener. The fastener is configured for movement within the fastener tube. The connecting rod has a bumper for engaging the lug and an obstruction element for engaging the fastener. The connecting rod is moveable between (i) a blocking position in which the obstruction element indicates the fastener is unaligned with the lug aperture, and (ii) a non-blocking position in which the fastener is aligned with a lug aperture. The connecting rod transitions to the non-blocking position in response to the lug moving the bumper of the connecting rod.

In another aspect, the present invention is directed to an elbow connector for receiving a cable assembly. The cable assembly has a lug with a lug aperture. The elbow connector includes a receiving cavity for the lug of the cable assembly and a fastener assembly. The fastener assembly has a connecting rod, a fastener tube, and a fastener. The fastener is configured to move within the fastener tube. The connecting rod has a bumper for engaging the lug and an obstruction element for engaging the fastener. The connecting rod is moveable between (i) a blocking position in which the obstruction element resists a certain movement of the fastener within the fastener tube, and (ii) a non-blocking position in which the fastener is movable within the fastener tube to allow the fastener to be fastened to the lug. The connecting rod transitions to the non-blocking position in response to the lug moving the bumper to a position at which the lug aperture of the lug is aligned with the fastener.

In another aspect, the present invention is directed to an elbow connector for receiving a cable assembly. The cable assembly has a lug with a lug aperture. The elbow connector includes a receiving cavity for the lug of the cable assembly and a fastener assembly. The fastener includes a connecting rod and a fastener. The fastener is configured for movement toward the lug. The connecting rod has a bumper for engaging the lug and an obstruction element for engaging the fastener. The connecting rod is moveable between (i) a blocking position in which the obstructon element indicates the fastener is unaligned with the lug aperture, and (ii) a non-blocking position in which the fastener is aligned with the lug aperture. The connecting rod transitions to the non-blocking position in response to the lug moving the bumper to a position at which the lug aperture is aligned with the fastener such that the fastener can be fastened to the lug.

In another aspect, the present invention is directed to an elbow connector for receiving a cable assembly. The cable assembly has a lug with a lug aperture. The elbow connector includes a receiving cavity for the lug of the cable assembly and a fastener assembly. The fastener assembly has a latch, a fastener tube, and a fastener. The fastener is configured for movement within the fastener tube. The latch has a bumper for engaging the lug and an obstruction element for engaging the fastener. The latch is pivotably moveable between (i) a blocking position in which the obstruction element contacts the fastener to prohibit engagement of the fastener with the lug, and (ii) a non-blocking position in which the fastener is aligned with the lug aperture such that the fastener can be fastened to the lug. The latch pivotably moves to the non-blocking position in response to the lug moving the bumper of the latch.

In another aspect, the present invention is directed to an elbow connector for receiving a cable assembly. The cable assembly has a lug with a lug aperture. The elbow connector includes a receiving cavity for the lug of the cable assembly and a fastener assembly. The fastener assembly has a latch, a fastener tube, and a fastener. The fastener is configured for movement within the fastener tube. The latch has a bumper for engaging the lug and an obstruction element for engaging the fastener. The latch is pivotably moveable between (i) a blocking position in which the obstruction element resists a certain movement of the fastener within the fastener tube, and (ii) a non-blocking position in which the fastener is moveable within the fastener tube to allow the fastener to be fastened to the lug. The latch transitions to the non-blocking position in response to the lug moving the bumper of the latch to a position at which the lug aperture is aligned with the fastener.

In another aspect, the present invention is directed to an elbow connector for receiving a cable assembly. The cable assembly has a lug with a lug aperture. The elbow connector includes a receiving cavity for the lug of the cable assembly and a fastener assembly. The fastener assembly has a latch, a spring, and a fastener. The fastener is configured for movement toward the lug. The latch has a bumper for engaging the lug and an obstruction element for engaging the fastener. The latch is pivotably moveable between (i) a blocking position in which the obstruction element inhibits a certain movement of the fastener within the fastener tube, and (ii) a non-blocking position in which the obstruction element is free of the fastener allowing the fastener to be fastened to the lug via the lug aperture. The latch is biased toward the blocking position by the spring and transitions to the non-blocking position in response to the lug moving the bumper to a position at which the lug aperture is aligned with the fastener.

The present invention also includes methods of installing a lug within an elbow connector.

The present invention further includes methods of ensuring alignment between a fastener element of a cable assembly and a lug aperture within an elbow connector.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The present invention will be described with greater specificity and clarity with reference to the following drawings, in which.

Figure 1:
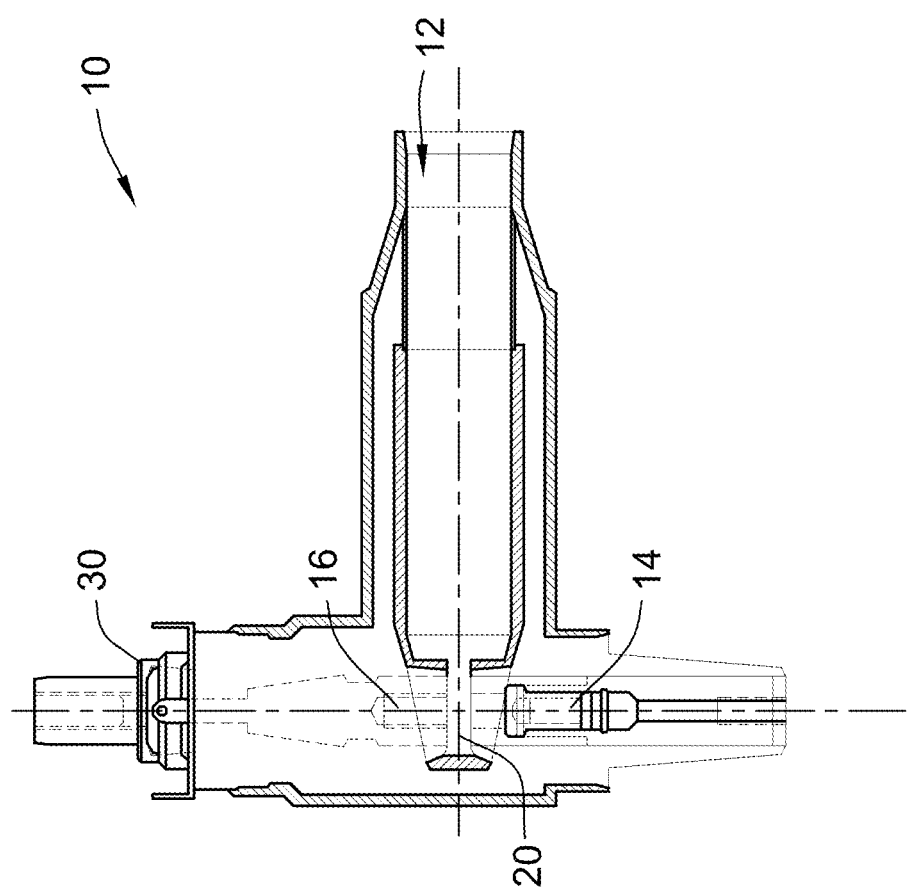
FIG. 1 illustrates a cross-sectional view of a typical elbow connector with a basic fastener assembly.

While the invention is susceptible to various modifications and alternative forms, specific embodiments will be shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

The drawings will herein be described in detail with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 illustrates a typical elbow connector 10. The elbow connector 10 includes a bore 12 into which a cable assembly (not shown) can be inserted. The cable assembly typically includes an electrical cable and a lug at the lead end of the cable. The lug has an aperture therein. The portion of the lug having the aperture is preferably inserted into a cavity 20 of the elbow connector 10 until the lug's aperture is aligned with a fastener 14 and a receiving cavity 16. The fastener 14 and the receiving cavity 16 are often integral with the elbow 10 connector (e.g., molded into elbow connector 10). Alternatively, the fastener 14 and the receiving cavity 16 can be parts of a device that is inserted into elbow connector 10.

The elbow connector 10 is designed for electrical connection to one or more devices 30, such as a transformer, high voltage switch, etc. When the cable assembly is inserted into the bore 12 of the elbow connector 10, the lug at the leading end of the cable assembly forms the electrical connection with the fastener 14 when the fastener 14 is received in the lug's aperture. The manipulation of the fastener 14 is performed manually by the operator, who has access to the head of the fastener 14 via an opening in the elbow connector 10. When the fastener 14 and the receiving cavity 16 are used together to clamp on both sides of the lug, proper connection is achieved. Though FIG. 1 illustrates one configuration of an elbow connector 10, the present invention is applicable to various configurations for elbow connectors.

Figure 2A:
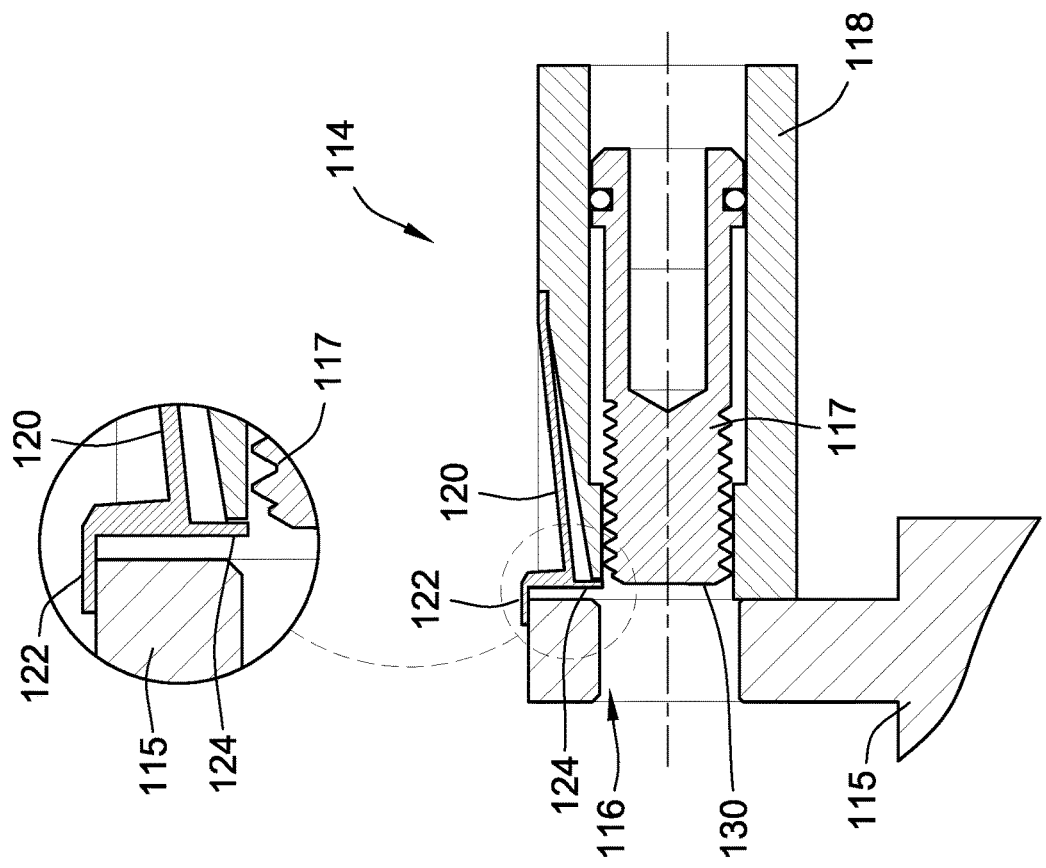
FIG. 2A illustrates a cross-sectional view of a first embodiment of an improved fastener assembly for an elbow connector when the lug aperture is not properly aligned with the male fastener.
Figure 2B:
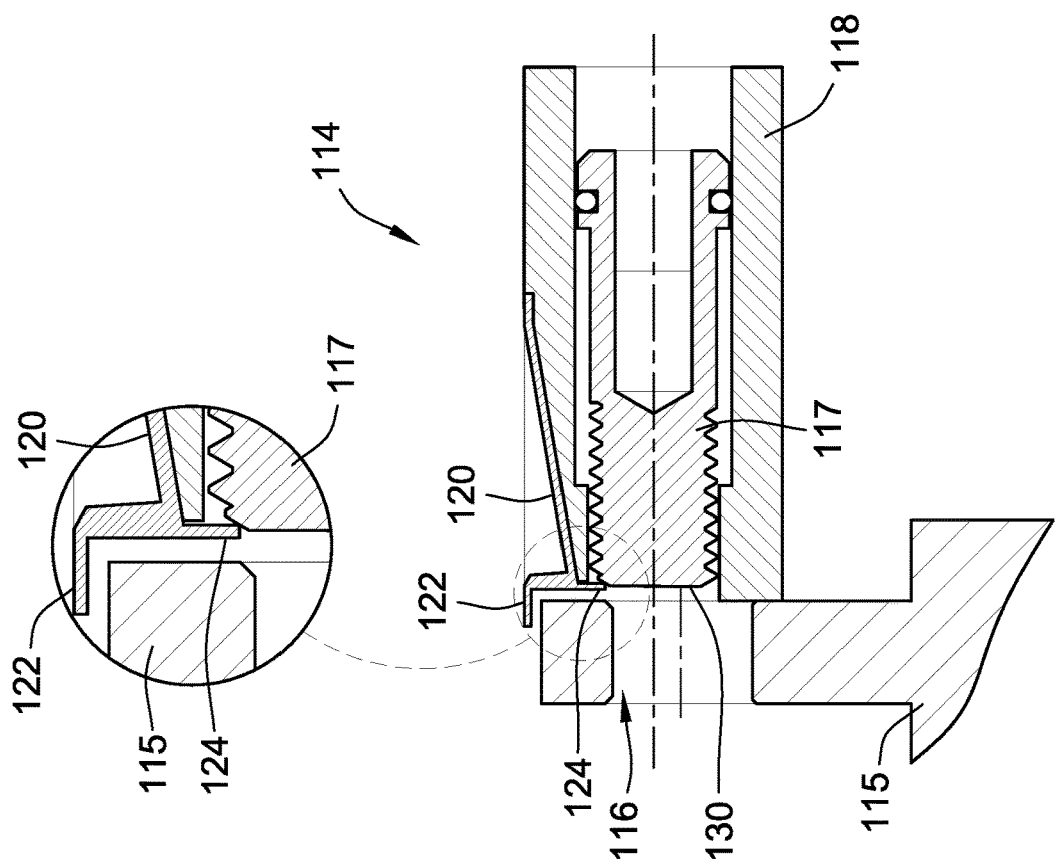
FIG. 2B illustrates a cross-sectional view of the first embodiment of FIG. 2A when the lug aperture is properly aligned with the male fastener.

FIGS. 2A and 2B illustrate a cross-sectional view of a first embodiment of an improved fastener assembly 114 for an elbow connector that can be used in place of the fastener 14 in FIG. 1. FIG. 2A illustrates the improved fastener assembly 114 when the lug 115 is positioned such that an aperture 116 of the lug 115 is not in alignment with a fastener 117 of the fastener assembly 114. FIG. 2B illustrates the fastener assembly 114 when the lug 115 is positioned such that the aperture 116 of the lug 115 is aligned with the fastener 117.

The fastener 117 is located within a fastener tube 118 of the fastener assembly 114. The fastener tube 118 includes a connecting rod 120 that resides within an axially extending channel of the fastener tube 118. The connecting rod 120 includes a bumper 122 at its distal end that interacts with lug 115. The bumper 122 is located near an obstructing projection 124 of the connecting rod 120 that interacts with the fastener 117. The bumper 122 extends into the cavity 20 of the elbow connector 10 of FIG. 1. The connecting rod 120 acts like a cantilever and exhibits spring-like action that biases its free end near the bumper 122 toward its lowermost position shown in FIG. 2A. The material and the configuration of the connecting rod 120 accomplishes this spring-like action. Alternatively, a spring may be used to urge the connecting rod 120 to its lowermost position that is shown in FIG. 2A.

Figure 3A:
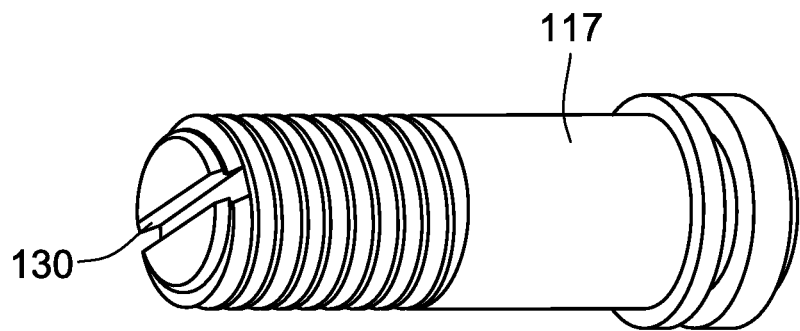
FIG. 3A illustrates a first perspective view of the fastener in the first embodiment of the fastener assembly of the improved elbow connector of FIGS. 2A-2B.
Figure 3B:
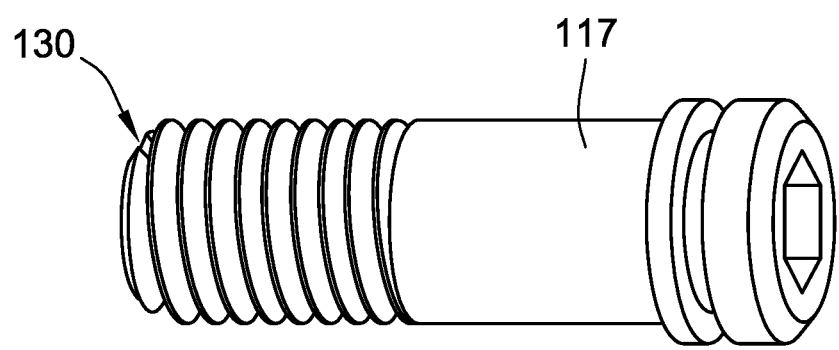
FIG. 3B illustrates a second perspective view of the fastener in the first embodiment of the fastener assembly of the improved elbow connector of FIGS. 2A-2B.

As shown in FIG. 2A, the obstructing projection 124 prevents the fastener 117 from being inserted through the aperture 116 when the lug 115 is not fully inserted into the bore 12 of the elbow connector 10 (FIG. 1). The obstructing projection 124 prevents the linear movement of the fastener 117 and, optionally the rotational movement as well. Specifically, the fastener 117 may include a groove or pocket 130 into which the obstructing projection 124 is inserted. As the user attempts to rotate the fastener 117 (without any linear motion due to the obstruction projection 124) when the lug's aperture 116 is out of alignment, the obstructing projection 124 eventually hits the groove 130, which then resists further rotation. FIGS. 3A and 3B illustrate the fastener 117 in more detail with the groove 130 at its lowermost end.

When the lug 115 is moved to its connecting position in which the aperture 116 is aligned with the fastener 117, the lug 115 moves the bumper 122 to a point where the obstructing projection 124 disengages from the fastener 117, as shown in FIG. 2B. The user's further attempts to rotate the fastener 117 can now be successfully accomplished, while ensuring proper alignment between the fastener 117 and the aperture 116 of the lug 115. The fastener 117 passes entirely through the lug 115 and is threadably attached to the female threads within the receiving cavity 16 of the elbow connector 10 (FIG. 1) for clamping the lug 115. Consequently, by virtue of the properly passing the fastener 117 through the aperture 116 of the lug 115, the cable assembly (which includes the lug 115) is now electrically coupled to the device 30 associated with the elbow connector 10 (FIG. 1).

Figure 4A:
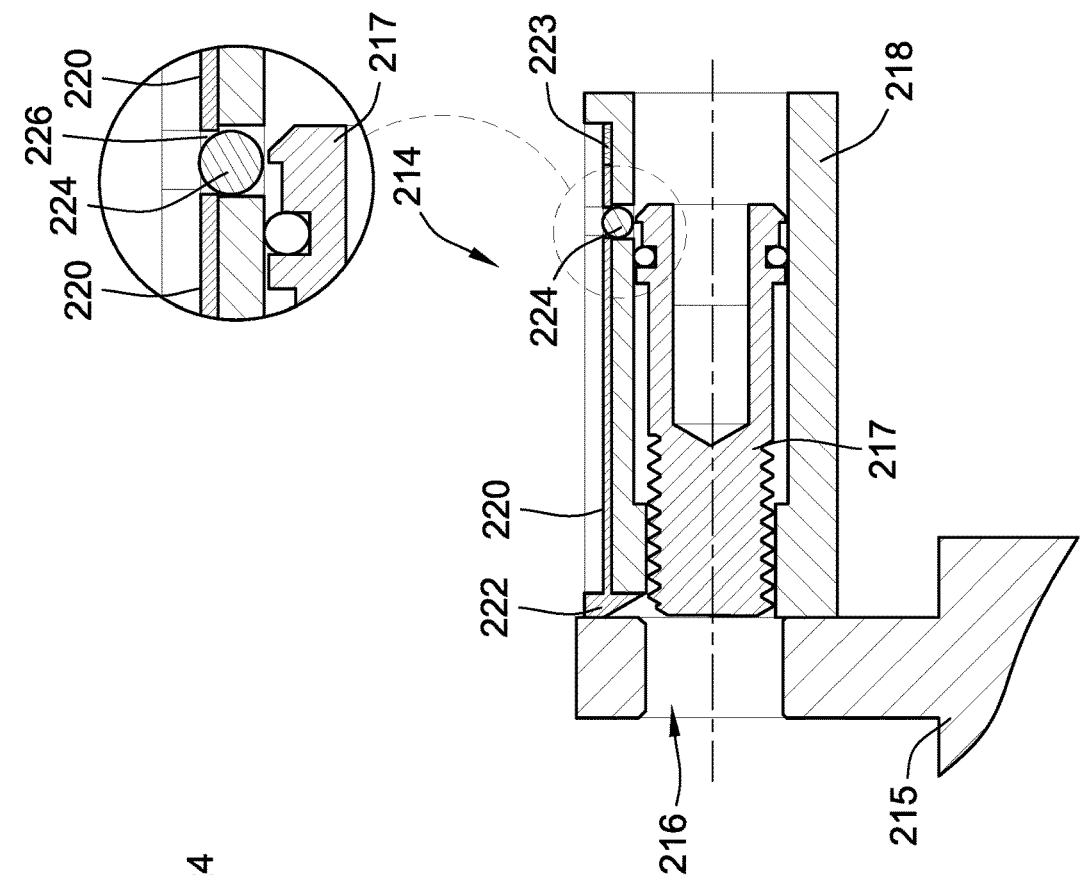
FIG. 4A illustrates a cross-sectional view of a second embodiment of an improved fastener assembly for an elbow connector when the lug aperture is not properly aligned with the male fastener.
Figure 4B:
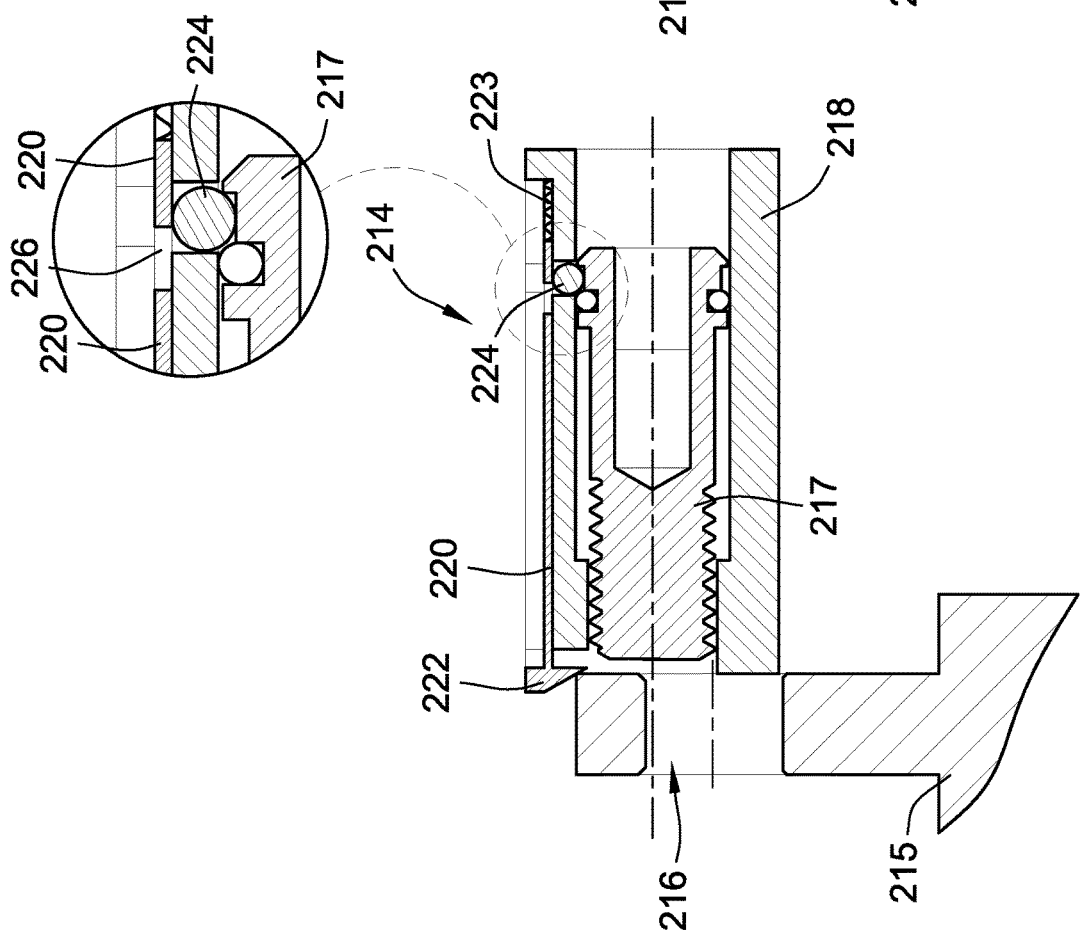
FIG. 4B illustrates a cross-sectional view of the second embodiment of FIG. 4A when the lug aperture is properly aligned with the male fastener.

FIGS. 4A and 4B illustrate a cross-sectional view of a second embodiment of an improved fastener assembly 214 for an elbow connector that can be used in place of the fastener 14 in FIG. 1. FIG. 4A illustrates the fastener assembly 214 when the lug 215 is positioned in a way that its aperture 216 is not in alignment with a fastener 217 of the fastener assembly 214. FIG. 4B illustrates the fastener assembly 214 when the aperture 216 of the lug 215 is aligned with the fastener 217.

The fastener 217 is located within a fastener tube 218 of the fastener assembly 214. The fastener tube 218 includes a connecting rod 220 that is positioned within an axially extending channel within the fastener tube 218. The connecting rod 220 includes a bumper 222 at its distal end that interacts with lug 215. In particular, the bumper 222 includes an inclined surface that engages the terminal end of the lug 215 adjacent to the aperture 216 of the lug 215. As shown in FIGS. 4A and 4B, the upward movement of the lug 215 against the inclined surface of the bumper 222 causes the connecting rod 220 to move to the right against the force of a spring 223, which is under compression and urging the connecting rod 220 to the left.

Figure 5C:
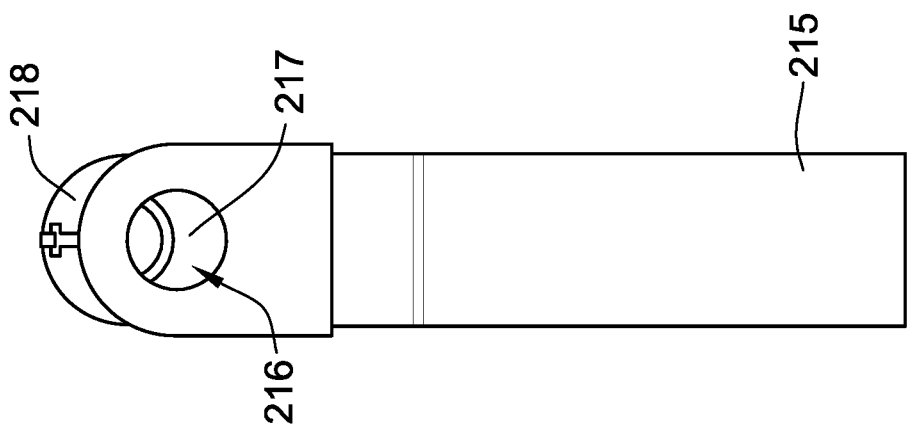
FIG. 5C illustrates an end view of the lug out of alignment with the male fastener in the second embodiment of FIGS. 4A-4B.
Figure 5B:
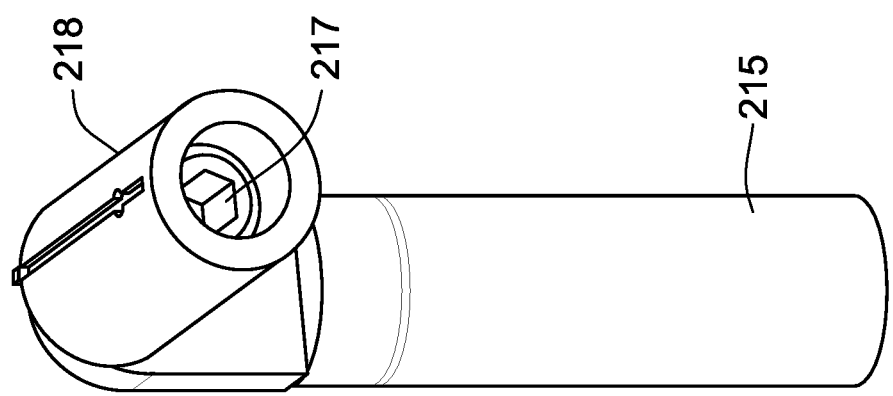
FIG. 5B illustrates a second perspective view of the lug out of alignment with the male fastener in the second embodiment of FIGS. 4A-4B.
Figure 5A:
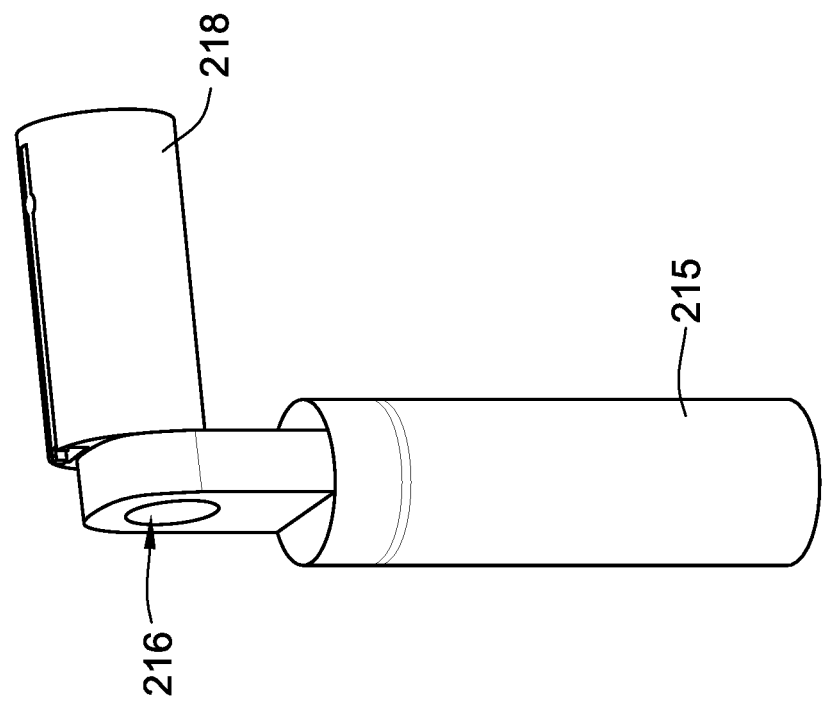
FIG. 5A illustrates a first perspective view of the lug out of alignment with the male fastener in the second embodiment of FIGS. 4A-4B.

An obstructing element 224 (such as a ball bearing or roller bearing) of the fastener assembly 214 is located below and is captured by the connecting rod 220. The obstructing element 224 can fit within a circumferential groove in the head of the fastener 217. As shown in FIG. 4A, when the obstructing element 224 is within the circumferential groove in the head of the fastener 217, the obstructing element 224 restricts the fastener 217 from linearly advancing toward the aperture 216 of the lug 215 because the head of the fastener 217 is too large to move past the obstructing element 224. FIGS. 5A-5C illustrate the relative positions of the lug 215 and the fastener tube 218 when they are out of alignment, such that the fastener 217 cannot advance into the aperture 216 due to the obstructing element 224.

Returning back to FIG. 4B, when the lug 215 is moved to its connecting position in which the aperture 216 is aligned with the fastener 217, the lug 215 moves the bumper 222 and the connecting rod 220 to the far right to a position at which the obstructing element 224 can now fit within a relief pocket 226 of the connecting rod 220. Thus, the obstructing element 224 now has space to move out of the circumferential groove of the head of the fastener 217, thereby permitting the fastener 217 to move linearly through the aperture 216 of the lug 215. Once the fastener 217 passes entirely through the lug 215, it can be threadably attached to the female threads within the receiving cavity 16 of the elbow connector 10 (FIG. 1) to clamp the lug 215. Consequently, by virtue of the proper connection of the fastener 217 to the lug 215, the cable assembly (which includes the lug 215) is electrically coupled to the device 30 associated with the elbow connector 10 (FIG. 1).

The improved fastener assemblies 114, 214 ensure that the user can reliably install the fastener 117, 217 entirely through the aperture of the lug despite the fact that user cannot visualize this engagement. In other words, relative to prior systems, the improved fastener assemblies 114, 214 remove false tactile indications of the completed installation of the fastener into lug aperture when, in fact, the fastener is merely lodged against a surface of the lug when the lug's aperture is not properly aligned with the fastener. Though the improved fastener assemblies 114, 214 have been described for use with threaded fasteners 117, 217, they can also be used with fasteners that lack threads, such that engagement of the fastener to the lug (or to a female connector on the other side of the lug) is accomplished via non-threaded engagement.

Figure 6A:
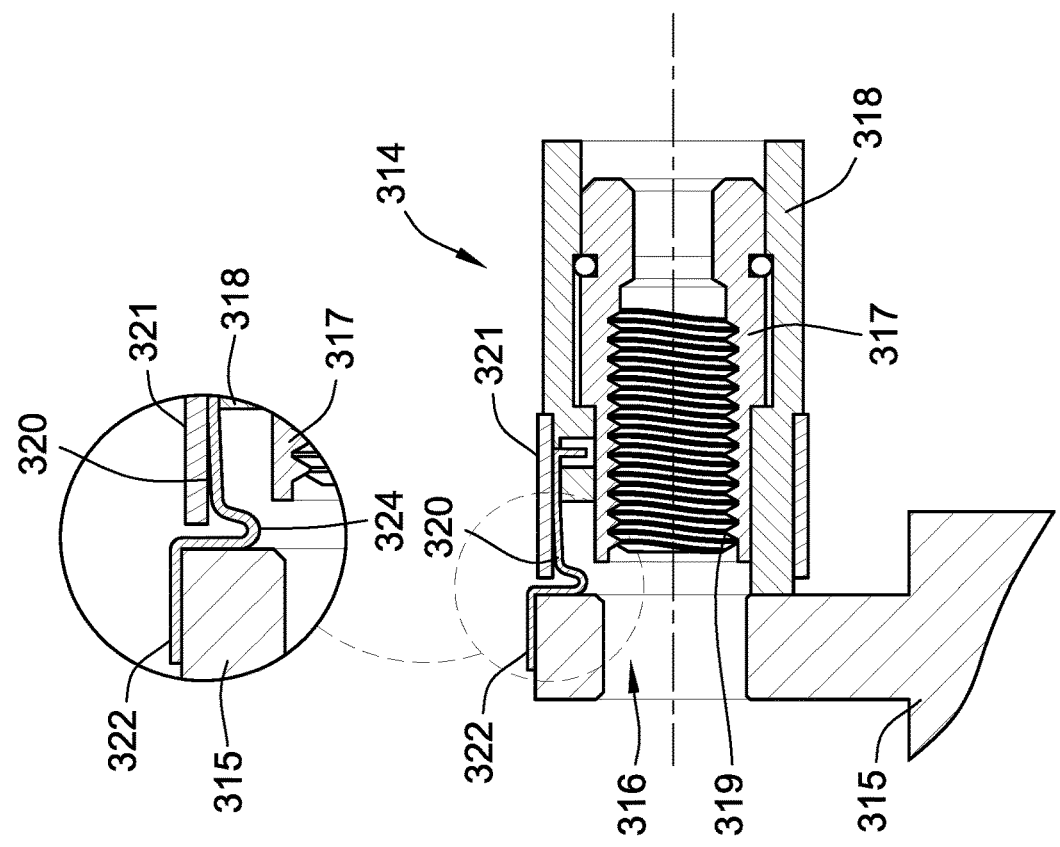
FIG. 6A illustrates a cross-sectional view of another embodiment of a female fastener assembly for an elbow connector when the lug aperture is not properly aligned with the female fastener.
Figure 6B:
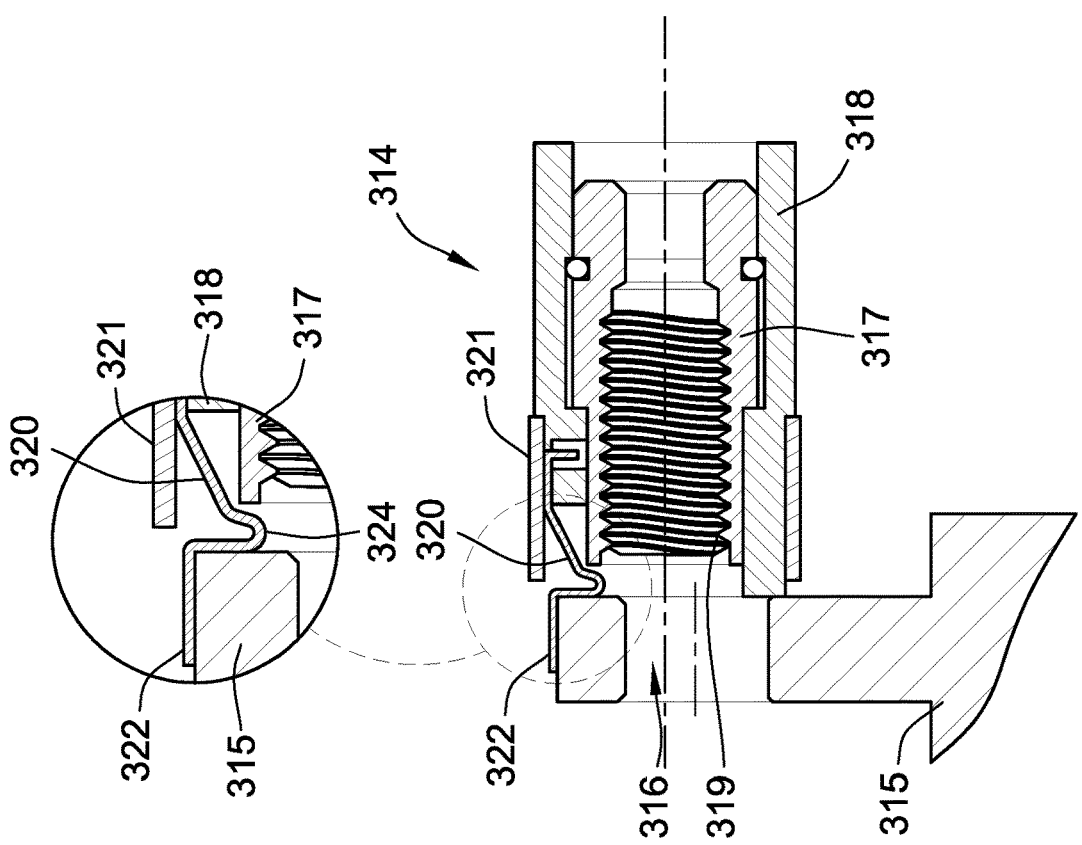
FIG. 6B illustrates a cross sectional view of the female fastener assembly of FIG. 6A when the lug aperture is properly aligned with the female fastener.

FIGS. 6A and 6B illustrate another embodiment with a female fastener assembly 314 for an elbow connector. FIG. 6A illustrates a lug 315 with a lug aperture 316 that is out of alignment with the female fastener assembly 314, while FIG. 6B illustrates the female fastener assembly 314 in alignment with the lug aperture 316.

The female fastener assembly 314 includes a fastener 317 and a fastener tube 318 in which the fastener 317 resides.

Unlike the prior embodiments, the fastener 317 is a female fastener with internal threads 319 within a bore at the end of the female fastener 317 facing the lug 315. The fastener tube 318 includes a connecting rod 320 that is positioned within a recessed region of fastener tube 318. An exterior tube 321 fits around the fastener tube 318 to retain the connecting rod 320 in the recessed region of the fastener tube 318.

The connecting rod 320 includes a bumper 322 at its distal end that interacts with the lug 315. As a point of reference, the bumper 322 extends into the cavity 20 of the elbow connector 10, as shown in FIG. 1. The bumper 322 is adjacent to an obstructing projection 324 on the connecting rod 320 that interacts with the fastener 317. In one embodiment, the obstructing projection 324 is a part of the connecting rod 320 and, preferably, includes a bent portion of the connecting rod 320. The connecting rod 320 acts like a cantilever and exhibits spring-like action that biases its free end near the bumper 322 toward its lowermost position, which is in the general region shown in FIG. 6A. The material and the configuration of the connecting rod 120 accomplishes this spring-like action. In one embodiment, the connecting rod 320 is a metallic spring clip that mates with the fastener tube 318. Alternatively, a spring may be used to urge the connecting rod 320 to its lowermost position.

As shown in FIG. 6A, the obstructing projection 324 prevents the fastener 317 from being rotated when the lug 315 is not fully inserted into the bore 12 of the elbow connector 10 (FIG. 1). The obstructing projection 324 prevents the rotational movement of the fastener 317 and, in some embodiments, may also prevent the linear movement as well to keep the fastener 317 away from the lug 315. Specifically, like the fastener 117 in FIGS. 3A-3B, the fastener 317 includes a groove or pocket into which the obstructing projection 324 can be inserted. When the aperture 316 of the lug 315 is out of alignment and the user attempts to rotate the fastener 317, the obstructing projection 324 eventually hits the groove or pocket in the bottom of the fastener 317, which then resists further rotation.

When the lug 315 is moved to its connecting position in which the aperture 316 is aligned with the fastener 317, as shown in FIG. 6B, the lug 315 moves the bumper 322 to a point where the obstructing projection 324 disengages from the fastener 317, as shown in FIG. 6B. The user's further attempts to rotate the fastener 317 are now able to be successfully completed, while ensuring proper alignment between the fastener 317 and the aperture 316 of the lug 315. At this point, the connection around the lug 315 can be completed.

Figure 7:
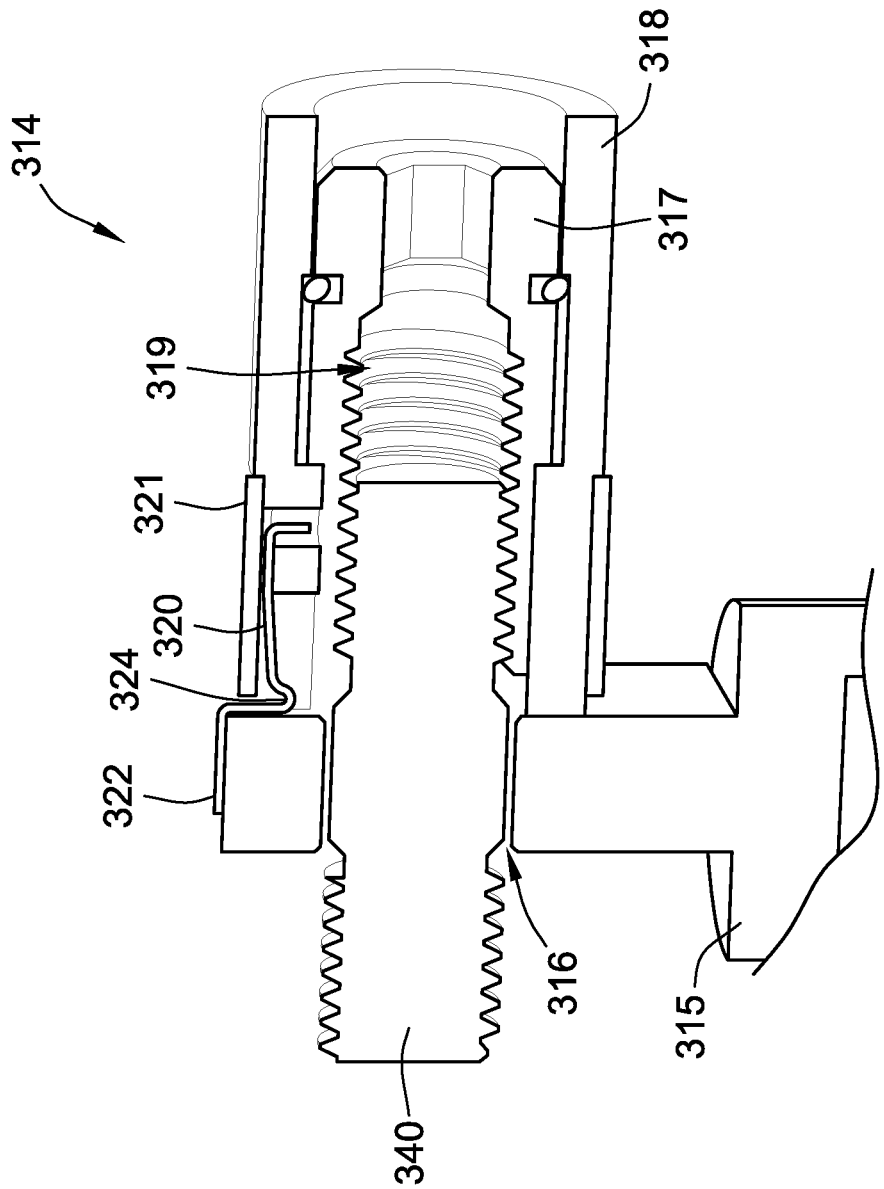
FIG. 7 illustrates the stud being inserted through the lug aperture and into the female fastener assembly of FIGS. 6A-6B.

Specifically, as shown in FIG. 7, the bumper 322 is moved to its upward position and the obstruction 324 has been disengaged from the fastener 317, which is positioned against the lug 315. The fastener 317 receives a stud 340 that passes through the opposing side of the lug aperture 316. The stud 340 is threadably received by the internal threads 319 of the fastener 317 and acts to clamp the lug 315. The stud 340 is typically fixed to the elbow connector 10 (FIG. 1) via various methods, as such, the stud 340 remains stationary with the lug 315. The stud 340 can have a larger head that abuts the lug 315 opposite of the female fastener 317, or the stud 340 can have male threads on both sides (as shown in FIG. 7) to engage a second female fastener that helps to clamp the lug 315 with the fastener assembly 314. Consequently, by virtue of the properly passing the stud 340 through the aperture 316 of the lug 315 and mating it with the female fastener 317, the cable assembly (which includes the lug 315) is now electrically coupled to the device 30 associated with the elbow connector 10 (FIG. 1).

The improved female fastener assembly 314 ensures that the user can reliably install the fastener 317 so that it is aligned with the aperture of the lug, despite the fact that user cannot visualize this engagement. In other words, relative to prior systems, the improved fastener assembly 314 removes false tactile indications of a completed installation when, in fact, the fastener and/or stud is merely lodged against a surface of the lug when the lug's aperture is not properly aligned with the fastener. Though the improved fastener assembly 314 have been described for use with threaded fasteners and studs, they can also be used with fasteners that lack threads, such that engagement of the fastener assembly to the lug (or to a female connector on the other side of the lug) is accomplished via non-threaded engagement.

These embodiments and obvious variations thereof is contemplated as falling within the spirit and scope of the claimed invention, which is set forth in the following claims. Moreover, the present concepts expressly include any and all combinations and subcombinations of the preceding elements and aspects.

We claim:

1. An elbow connector for receiving a cable assembly having a lug with a lug aperture, comprising:
   a receiving cavity for the lug of the cable assembly; and
   a fastener assembly having a connecting rod, a fastener tube, and a fastener, the fastener configured for movement within the fastener tube, the connecting rod having a bumper for engaging the lug and an obstruction element for engaging the fastener, the connecting rod being moveable between (i) a blocking position in which the obstruction element indicates the fastener is unaligned with the lug aperture, and (ii) a non-blocking position in which the fastener is aligned with the lug aperture; and
   wherein the connecting rod transitions to the non-blocking position in response to the lug moving the bumper of the connecting rod.

2. The elbow connector of claim 1, wherein the fastener is a male fastener that moves through the lug aperture.

3. The elbow connector of claim 1, wherein the fastener is a female fastener that receives a stud that moves through the lug aperture and is threadably received by internal threads of the female fastener.

4. The elbow connector of claim 1, wherein the connecting rod is metallic and exhibits spring-like action.

5. The elbow connector of claim 4, wherein the spring-like action of the connecting rod biases the connecting rod toward the blocking position.

6. The elbow connector of claim 5, wherein the bumper extends across and engages an uppermost surface of the lug.

7. The elbow connector of claim 1, wherein the bumper extends across and engages an uppermost surface of the lug.

8. The elbow connector of claim 1, wherein the connecting rod laterally moves in a direction generally parallel to a central axis of the fastener when transitioning to the non-blocking position.

9. The elbow connector of claim 8, wherein the bumper includes an inclined surface for engaging the lug.

10. An elbow connector for receiving a cable assembly having a lug with a lug aperture, comprising:
    a receiving cavity for the lug of the cable assembly; and
    a fastener assembly having a connecting rod, a fastener tube, and a fastener, the fastener configured for movement within the fastener tube, the connecting rod having a bumper for engaging the lug and an obstruction element for engaging the fastener, the connecting rod being moveable between (i) a blocking position in which the obstruction element resists a certain movement of the fastener within the fastener tube, and (ii) a non-blocking position in which the fastener is movable within the fastener tube to allow the fastener to be fastened to the lug; and wherein the connecting rod transitions to the non-blocking position in response to the lug moving the bumper to a position at which the lug aperture of the lug is aligned with the fastener.

11. The elbow connector of claim 10, wherein the fastener is a male fastener that moves through the lug aperture.

12. The elbow connector of claim 10, wherein the fastener is a female fastener that receives a stud that moves through the lug aperture and is threadably received by internal threads of the female fastener.

13. The elbow connector of claim 12, wherein the certain movement is rotational movement.

14. The elbow connector of claim 12, wherein the certain movement is linear movement toward the lug.

15. The elbow connector of claim 10, wherein the connecting rod is metallic and exhibits spring-like action.

16. The elbow connector of claim 15, wherein the spring-like action of the connecting rod biases the connecting rod toward the blocking position.

17. The elbow connector of claim 10, wherein the bumper extends across and engages an uppermost surface of the lug.

18. The elbow connector of claim 10, wherein the bumper includes an inclined surface for engaging the lug.

19. An elbow connector for receiving a cable assembly having a lug with a lug aperture, comprising:
  a receiving cavity for the lug of the cable assembly; and
  a fastener assembly having a connecting rod and a fastener, the fastener configured for movement toward the lug, the connecting rod having a bumper for engaging the lug and an obstruction element for engaging the fastener, the connecting rod being moveable between (i) a blocking position in which the obstruction element indicates the fastener is unaligned with the lug aperture, and (ii) a non-blocking position in which the fastener is aligned with the lug aperture; and
  wherein the connecting rod transitions to the non-blocking position in response to the lug moving the bumper to a position at which the lug aperture is aligned with the fastener such that the fastener can be fastened to the lug.

20. The elbow connector of claim 19, wherein the fastener is a female fastener that receives a stud that moves through the lug aperture and is threadably received by internal threads of the female fastener.

* * * * *